US011289764B2

(12) United States Patent
Murayama (10) Patent No.: US 11,289,764 B2
(45) Date of Patent: Mar. 29, 2022

(54) BATTERY PACK

(71) Applicant: Panasonic Intellectual Property Management Co., Ltd., Osaka (JP)

(72) Inventor: Chifumi Murayama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/637,467

(22) PCT Filed: Aug. 21, 2018

(86) PCT No.: PCT/JP2018/030772
§ 371 (c)(1),
(2) Date: Feb. 7, 2020

(87) PCT Pub. No.: WO2019/044581
PCT Pub. Date: Mar. 7, 2019

(65) Prior Publication Data
US 2020/0251697 A1    Aug. 6, 2020

(30) Foreign Application Priority Data
Aug. 29, 2017  (JP) .............................. JP2017-164448

(51) Int. Cl.
*H01M 50/209*  (2021.01)
*H01M 50/20*   (2021.01)

(52) U.S. Cl.
CPC ......... *H01M 50/209* (2021.01); *H01M 50/20* (2021.01)

(58) Field of Classification Search
CPC combination set(s) only.
See application file for complete search history.

(56) References Cited

U.S. PATENT DOCUMENTS

2005/0164077 A1* 7/2005 Bacon ................. H01M 8/2475
                                                    429/66
2010/0167116 A1   7/2010 Okada
(Continued)

FOREIGN PATENT DOCUMENTS

CN    205723711 U    11/2016
CN    205900653 U     1/2017
(Continued)

OTHER PUBLICATIONS

International Search Report of PCT application No. PCT/JP2018/030772 dated Oct. 9, 2018.
(Continued)

*Primary Examiner* — Maria Laios
*Assistant Examiner* — Grace Ann Kenlaw
(74) *Attorney, Agent, or Firm* — McDermott Will and Emery LLP (57) ABSTRACT

A battery pack includes: a housing; a battery stack being housed in the housing, the battery stack including a plurality of prismatic batteries stacked on each other in a row; a one-side restraint portion that restrains one side of the battery stack in a Y direction; an opposite-side restraint portion that restrains another side of the battery stack in the Y direction; a housing-side end plate that restrains one side in the X direction of the battery stack and oppositely faces a housing inner-surface in the X direction; and a plate movement allowing and positioning mechanism that allows movement of the housing-side end plate in the X direction due to the expansion of the battery stack in the X direction, and positions the housing-side end plate with respect to housing 2 in the Y direction.

6 Claims, 7 Drawing Sheets

(56) References Cited

U.S. PATENT DOCUMENTS

2013/0330579 A1* 12/2013 Ejiri .................... H01M 50/572
429/53
2018/0183025 A1* 6/2018 Cao ....................... H01M 50/24

FOREIGN PATENT DOCUMENTS

| CN | 206250253 U | * | 6/2017 | ............ H01M 50/20 |
|---|---|---|---|---|
| JP | 2010-157451 | | 7/2010 | |
| JP | 2013-025933 | | 2/2013 | |
| JP | 2013-025983 A | | 2/2013 | |
| JP | 2017-059299 | | 3/2017 | |

OTHER PUBLICATIONS

English Translation of Chinese Office Action dated Jan. 13, 2022 for the related Chinese Patent Application No. 201880052622.5.

* cited by examiner

BATTERY PACK

CROSS-REFERENCE TO RELATED APPLICATIONS

This application is a U.S. national stage application of the PCT International Application No. PCT/JP2018/030772 filed on Aug. 21, 2018, which claims the benefit of foreign priority of Japanese patent application 2017-164448 filed on Aug. 29, 2017, the contents all of which are incorporated herein by reference.

TECHNICAL FIELD

This disclosure relates to a battery pack which includes a housing, and a plurality of prismatic batteries housed in the housing.

BACKGROUND ART

A conventional battery pack is disclosed in PTL 1. The battery pack includes a housing, and a plurality of battery modules disposed in the housing. Each of the battery modules includes a plurality of battery cells which are stacked in a row in an overlapping manner in a thickness direction in the same posture. The respective battery modules are mounted on a bottom portion of the housing using bolts.

CITATION LIST

Patent Literature

PTL 1: Unexamined Japanese Patent Publication No. 2017-59299

SUMMARY OF THE INVENTION

There is a demand for a battery pack having an increased capacity to increase an amount of power supply and, further, there is a demand for a battery module having an increased number of prismatic batteries stacked on each other. The respective prismatic batteries expand due to charging or discharging of electricity and degradation of the batteries and hence, when the number of stacked prismatic batteries is increased, expansion of the battery module in a stacking direction of the batteries is increased. Accordingly, to arrange battery stack in a stable manner, the configuration has been desired where the battery stack can be positioned in a direction orthogonal to a stacking direction of batteries with respect to a housing, and expansion of the battery stack in the stacking direction is allowed. However, in a battery pack disclosed in PTL 1, a battery module is fixed to a bottom plate of a housing in a non-movable manner. Accordingly, although the battery stack can be positioned with respect to a housing in a direction orthogonal to a stacking direction, expansion of the battery module is not allowed so that it is difficult to increase a capacity of the battery pack.

Accordingly, it is an object of the present invention to provide a battery pack where a battery stack can be positioned with respect to a housing in a direction orthogonal to a stacking direction of batteries and, further, expansion of prismatic batteries in the stacking direction can be allowed thus easily increasing a capacity of the battery pack.

To overcome the above-mentioned drawback, a battery pack according to this disclosure includes: a housing; a battery stack that is housed in the housing, the battery stack including a plurality of prismatic batteries stacked on each other in a row, each of the plurality of prismatic batteries having a substantially rectangular-parallelepiped shape and having a pair of end surfaces and two pairs of side surfaces, one of the two pairs of side surfaces being substantially orthogonal to a stacking direction of the prismatic batteries; a one-side restraint portion that is positioned on one side of the respective prismatic batteries in an orthogonal direction orthogonal to both of the stacking direction and a height direction, and restrains one side of the battery stack in the orthogonal direction such that one-side side surfaces of the respective prismatic batteries included in the other pair of side surfaces are positioned substantially on a same plane; an opposite-side restraint portion that is positioned on another side of the respective prismatic batteries in the orthogonal direction, and restrains another side of the battery stack in the orthogonal direction such that opposite-side side surfaces of the respective prismatic batteries included in the other pair of side surfaces are positioned substantially on a same plane; a housing-side end plate that restrains one side of the battery stack in the stacking direction by being brought into contact with an end surface on one side in the stacking direction of the battery stack, and oppositely faces a housing inner-surface in the stacking direction; and a plate movement allowing and positioning mechanism that allows movement of the housing-side end plate in the stacking direction due to expansion of the battery stack in the stacking direction, and positions the housing-side end plate with respect to the housing in the orthogonal direction.

A battery pack according to this disclosure includes: a housing; a plurality of battery stacks arranged in plural rows in the housing, each of the plurality of battery stacks including a plurality of prismatic batteries stacked on each other in a row, each of the plurality of prismatic batteries having a substantially rectangular-parallelepiped shape and having a pair of end surfaces and two pairs of side surfaces, one of the two pairs of side surfaces being substantially orthogonal to a stacking direction of the prismatic batteries; a common restraint portion that is disposed between every two battery stacks disposed adjacently to each other in an orthogonal direction orthogonal to both the stacking direction and a height direction of the prismatic batteries, and restrains a side surface of one battery stack on a side of the other battery stack out of the two battery stacks and a side surface of the other battery stack on a side of the one battery stack side; an outer restraint portion that restrains outer sides in the orthogonal direction of battery stacks positioned on both ends in the orthogonal direction out of the plurality of battery stacks; a housing-side end plate that is provided to each of the battery stacks, restrains one side of the corresponding battery stack in the stacking direction, and oppositely faces a housing inner-surface in the stacking direction; an integrated opposite-end-side restraint portion that restrains another side of the plurality of battery stacks in the stacking direction; and a plate movement allowing and positioning mechanism that allows movement of the housing-side end plate in the stacking direction due to expansion of the battery stacks in the stacking direction, and positions the housing-side end plate in the orthogonal direction with respect to the housing.

The plate movement allowing and positioning mechanism may be disposed on both sides, that is, one side and the other side in the stacking direction of at least one battery stack. Further, the plate movement allowing and positioning mechanism may include a mechanism which is provided independently from the housing-side end plate and the housing, and may be formed of a portion of the housing-side end plate and a portion of the housing.

According to the battery pack of this disclosure, the battery stack can be positioned in the direction orthogonal to the stacking direction with respect to the housing and, further, an expansion of the prismatic battery in the stacking direction is allowed and hence, a capacity of the battery pack can be easily increased.

DESCRIPTION OF EMBODIMENTS

Hereinafter, exemplary embodiments of this disclosure will be described in detail with reference to the attached drawings. It is envisaged from a beginning that if a plurality of exemplary embodiments and modifications are described below, technical features of the plurality of exemplary embodiments and modifications are appropriately combined to make new exemplary embodiments. In a description of the exemplary embodiments described later and the drawings, an X direction indicates a stacking direction along which prismatic batteries are stacked, and agrees with a thickness direction of the prismatic battery. A Y direction indicates an orthogonal direction orthogonal to both the stacking direction and a height direction of a prismatic battery. A Z direction indicates a height direction of the prismatic battery, and agrees with the height direction of a battery pack (housing). The X direction, Y direction, and Z direction are orthogonal to each other.

First Exemplary Embodiment

Figure 1:
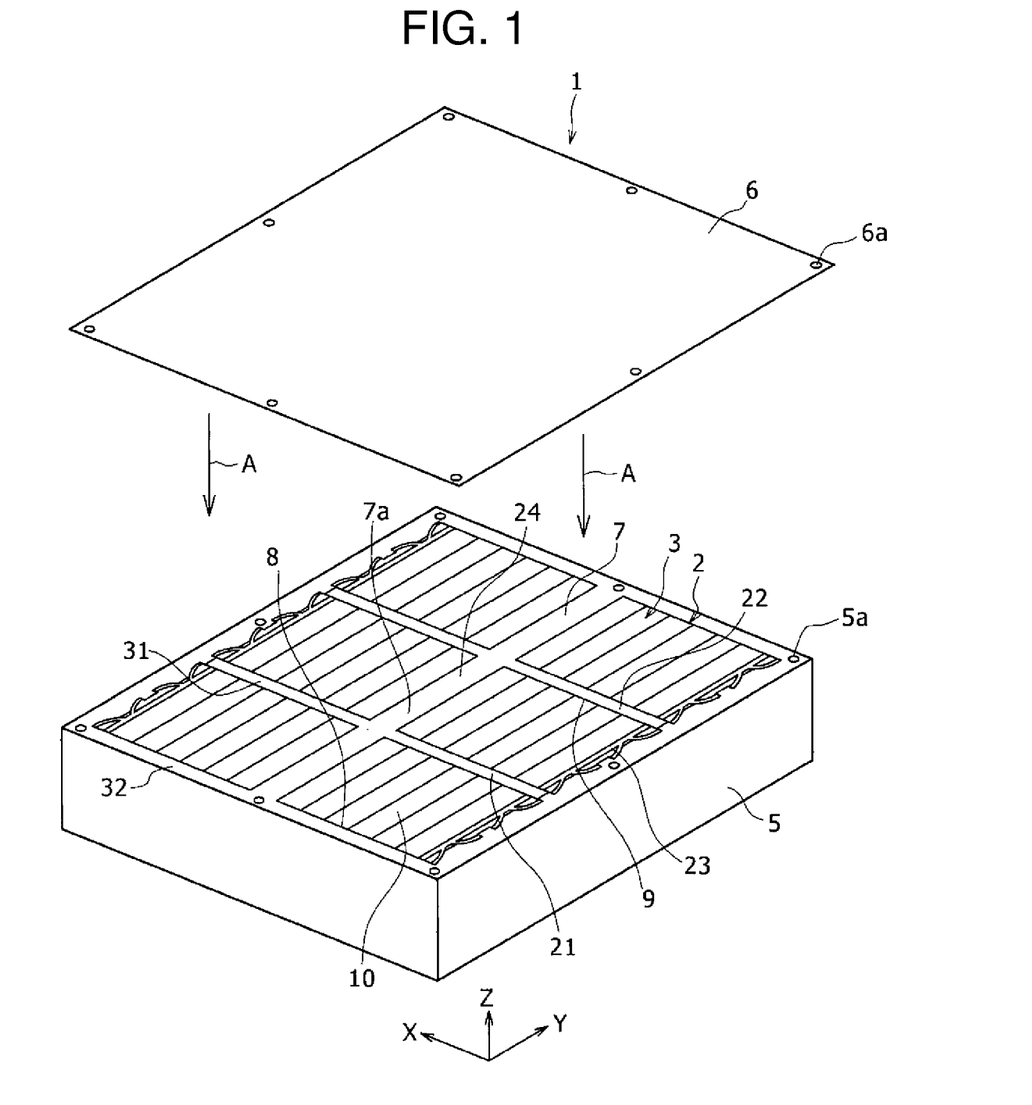
FIG. 1 is a schematic constitutional view of a battery pack according to a first exemplary embodiment of this disclosure.

FIG. 1 is a schematic constitutional view of battery pack 1 according to a first exemplary embodiment of this disclosure. As shown in FIG. 1, battery pack 1 includes: housing 2; and a plurality of battery stacks 3 arranged in housing 2. Housing 2 includes: body 5; lid 6; and integrated partition wall 7. Body 5 is formed such that only one side in the Z direction is opened, and defines rectangular-parallelepiped chamber (recessed portion) 8. A length of partition wall 7 in the X direction is substantially equal to a length of chamber 8 in the X direction, and a length of partition wall 7 in the Y direction is also substantially equal to a length of chamber 8 in the Y direction. Partition wall 7 is disposed in chamber 8, and chamber 8 is divided into six same battery housing chambers 9. In an example shown in FIG. 1, three battery housing chambers 9 overlap with each other as viewed in the Y direction, and two battery housing chambers 9 overlap with each other as viewed in the X direction.

Each battery stack 3 is housed in battery housing chamber 9. Battery stack 3 is formed of a plurality of approximately rectangular-parallelepiped prismatic batteries 10 which are stacked such that the plurality of prismatic (=rectangular) batteries 10 overlap with each other in a row in the X direction in the same posture without forming a gap between the prismatic batteries. Each prismatic battery 10 has a pair of end surfaces (two end surfaces), and two pairs of side surfaces (four side surfaces). In each battery stack 3, one pair of side surfaces of prismatic battery 10 are orthogonal to the X direction. For example, each prismatic battery 10 is a rechargeable secondary battery, such as a lithium-ion battery, a nickel metal hydride battery, or a nickel-cadmium battery. Main surfaces of prismatic battery 10 are covered with an insulating sheet such as a heat shrink tube. After battery stacks 3 are housed in respective battery housing chambers 9, lid 6 is moved toward the other side in the Z direction indicated by arrow A, and is made to cover body 5 so as to close an opening of body 5. Then, screws not shown are inserted into through holes 6a formed in lid 6 and threaded holes 5a formed in an upper end portion of the body. Due to such insertion of the screws, lid 6 is mounted on body 5 thus forming battery pack 1.

In battery stack 3, one side in the Y direction is restrained by one-side restraint portion 21, and the other side in the Y direction is restrained by opposite-side restraint portion 22. Further, one side of each battery stack 3 in the X direction is restrained by housing-side end plate 23, and the other side of each battery stack 3 in the X direction is restrained by opposite-end-side restraint portion 24. In each battery stack 3, one-side side surfaces of respective prismatic batteries 10 in the Y direction included in the other pair of side surfaces are positioned substantially on the same plane due to restraining by one-side restraint portion 21, and opposite-side side surfaces of respective prismatic batteries 10 in the Y direction included in the other pair of side surfaces are positioned substantially on the same plane due to restraining by opposite-side restraint portion 22. Housing-side end plate 23 is brought into contact with an end surface on one side in the X direction of battery stack 3, and oppositely faces a housing inner-surface in the X direction. Further, opposite-end-side restraint portion 24 is brought into contact with end surfaces on the other side in the X direction of battery stacks 3. One-side and opposite-side restraint portions 21, 22 are elongated flat plate portions, and a longitudinal direction of restraint portions 21, 22 agrees with the X direction, and a width direction of restraint portions 21, 22 agrees with the Z direction. On the other hand, housing-side end plate 23 is formed of an elongated plate member, and opposite-end-side restraint portion 24 is an elongated flat plate portion. With respect to housing-side end plate 23 and opposite-end-side restraint portion 24, a longitudinal direction agrees with the Y direction, and a width direction agrees with the Z direction.

Battery pack 1 includes common restraint portions 31, and outer restraint portions 32. Common restraint portion 31 agrees with a restraint portion which is disposed between two battery stacks 3 disposed adjacently to each other in the Y direction out of one-side and opposite-side restraint portions 21, 22. Common restraint portion 31 restrains, out of two battery stacks 3 disposed adjacently to each other in the Y direction, a side surface of one battery stack 3 on the other battery stack side and a side surface of the other battery stack 3 on the one battery stack side. Outer restraint portions 32 agree with restraint portions which are provided to ends in the Y direction out of one-side and opposite-side restraint portions 21, 22. Outer restraint portion 32 restrains an outer side in the Y direction of battery stack positioned at an end in the Y direction. Common restraint portions 31 and opposite-end-side restraint portion 24 are each formed of portions of partition wall 7, and outer restraint portions 32 are formed of portions of body 5 of housing 2. Housing-side end plates 23 are formed as bodies separated from partition wall 7 and housing 2, and both sides in the Y direction of housing-side end plate 23 are restrained by one-side restraint portion 21 and opposite-side restraint portion 22. Housing-side end plate 23 is sandwiched between the battery at an end of battery stack 3 and the housing inner-surface. Housing-side end plate 23 may be made of any metal material. However, it is preferable that housing-side end plate 23 be made of stainless steel or an iron-based steel material having spring property.

In each prismatic battery 10, for example, both a positive electrode and a negative electrode are mounted on an upper end portion in the Z direction. The plurality of prismatic batteries 10 included in the same battery stack 3 are electrically connected to each other in series via bus bars not shown, for example, and six battery stacks 3 included in battery pack 1 are electrically connected to each other in parallel or in series via bus bars not shown. Alternatively, the plurality of prismatic batteries included in the same battery stack may be electrically connected to each other in parallel, and the plurality of battery stacks included in the battery pack may be electrically connected to each other in parallel or in series. These electrical connections are realized through the through holes (not shown) formed in partition wall 7, for example.

It is preferable that partition wall 7 be fixed to a bottom portion of body 5 using fixing means such as an adhesive agent, a fastening member or the like, and opposite-end-side restraint portion 24 be not movable relative to housing 2. However, partition wall 7 need not be fixed to housing 2. Further, the partition wall may divide the chamber into a plurality of battery housing chambers other than six chambers, and the plurality of battery housing chambers may include two or more battery chambers which differ from each other in shape or size. The battery stack may include a plurality of resin-made separators which are stacked with the plurality of prismatic batteries such that the separators and the prismatic batteries are alternately stacked, and the prismatic batteries disposed adjacently to each other may be insulated from each other by the separator. The battery stack may include a spacer which is disposed between the prismatic battery on one end in the X direction and the housing-side end plate thus filling a gap formed between the prismatic battery on the one end and the housing-side end plate. The battery stack may also include a spacer which is disposed between the prismatic battery on the other end in the X direction and the opposite-end-side restraint portion thus filling a gap formed between the prismatic battery on the other end and the opposite-end-side restraint portion. In these configurations, the spacers may have an elasticity. In this case, even when there is a change in size of a gap between the prismatic battery at the end in the X direction and at least one of the housing-side end plate and the opposite-end-side restraint portion, the gap between the prismatic battery at the end in the X direction and at least one of the housing-side end plate and the opposite-end-side restraint portion can be easily filled by the spacer. Accordingly, such a configuration is preferable for arranging the battery stacks in a close contact state in the X direction.

Figure 2:
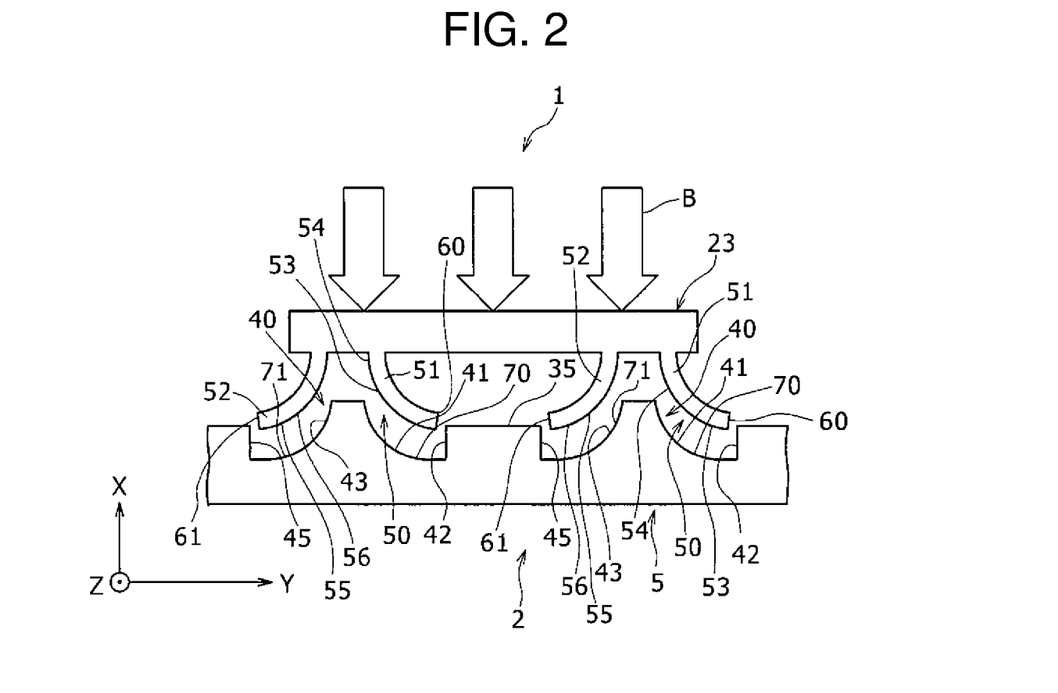
FIG. 2 is a view for explaining a structure of a housing-side end plate of the battery pack and a structure around the housing-side end plate, and is also a view for explaining a plate movement allowing and positioning mechanism.
Figure 3:
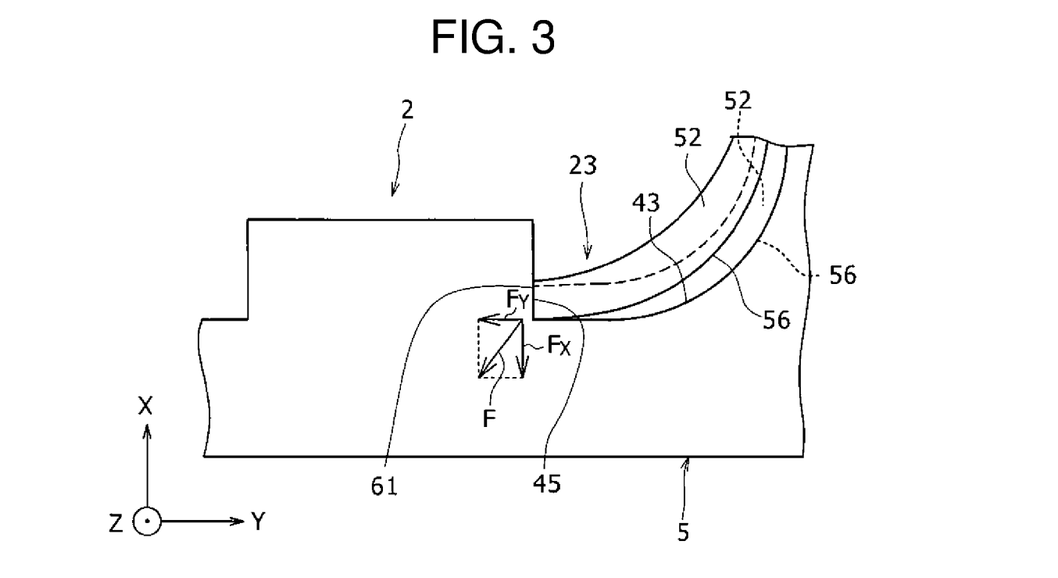
FIG. 3 is a view for explaining the manner of operation of the above-mentioned plate movement allowing and positioning mechanism.

FIG. 2 is a view for explaining a structure of housing-side end plate 23 of battery pack 1 and a structure around housing-side end plate 23, and is also a view for explaining a plate movement allowing and positioning mechanism. FIG. 3 is a view for explaining the manner of operation of the plate movement allowing and positioning mechanism. In FIG. 2, a state is shown where housing-side end plate 23 is shown in a spaced-apart manner from housing inner-surface 35 of body 5 of housing 2 in the X direction so that a force in the X direction is not applied to housing-side end plate 23. However, in an actual configuration, as shown in FIG. 3, housing-side end plate 23 is brought into contact with housing inner-surface 35 in all states, and a force is applied to housing-side end plate 23 from housing inner-surface 35.

As shown in FIG. 2, as viewed in a plan view when the configuration is viewed from the outside in the Z direction, housing inner-surface 35 has two pairs of engaging portions 40 which are disposed in a spaced-apart manner from each other in the Y direction, and housing-side end plate 23 has two pairs of protruding structures 50. Two pairs of engaging portions 40 and two pairs of protruding structures 50 form the plate movement allowing and positioning mechanism. Each engaging portion 40 has first curved surface 41, first flat surface 42, second curved surface 43, and second flat surface 45. First curved surface 41 is displaced toward a side opposite to a battery stack 3 (see FIG. 1) side in the X direction as first curved surface 41 extends toward one side in the Y direction. First curved surface 41 has an arcuate shape protruding toward a side opposite to a battery stack 3 side in the X direction. First flat surface 42 extends toward the battery stack 3 side in the X direction from an end of first curved surface 41 on the one side in the Y direction.

On the other hand, second curved surface 43 is positioned on the other side of first curved surface 41 in the Y direction. Second curved surface 43 is displaced toward a side opposite to a battery stack 3 side in the Y direction as second curved surface 43 extends toward the other side in the Y direction.

Second curved surface 43 has an arcuate shape protruding toward the side opposite to the battery stack 3 side in the X direction. Further, second flat surface 45 extends toward the battery stack 3 side in the X direction from an end of second curved surface 43 on the other side in the Y direction. First curved surface 41 and first flat surface 42 form first groove 70 having a semicircular bottom surface as viewed in a plan view and extending in the Z direction, and second curved surface 43 and second flat surface 45 form second groove 71 having a semicircular bottom surface as viewed in a plan view and extending in the Z direction. There exists a first plane with respect to which first groove 70 and second groove 71 are substantially symmetric.

Each protruding structure 50 includes first protruding portion 51 and second protruding portion 52. First protruding portion 51 protrudes toward a housing inner-surface 35 side in the X direction, and has third curved surface 54 which is displaced toward the side opposite to the battery stack 3 side in the X direction as surface 53 on the housing inner-surface 35 side in the X direction extends toward the one side in the Y direction. Third curved surface 54 has an arcuate shape protruding toward the side opposite to the battery stack 3 side in the X direction. Further, second protruding portion 52 protrudes toward the housing inner-surface 35 side in the X direction, and has fourth curved surface 56 which is displaced toward the side opposite to the battery stack 3 side in the X direction as surface 55 on the housing inner-surface 35 side in the X direction extends toward the other side in the Y direction. Fourth curved surface 56 has an arcuate shape protruding toward the side opposite to the battery stack 3 side in the X direction. There exists a second plane with respect to which first protruding portion 51 and second protruding portion 52 are substantially symmetric. In a state where battery pack 1 is formed, the above-mentioned first plane substantially agrees with the second plane.

In the above-mentioned configuration, first protruding portion 51 is housed in first groove 70, and second protruding portion 52 is housed in second groove 71. In a state where respective prismatic batteries 10 are not expanded, that is, in a state where manufactured battery pack 1 is not yet used, as indicated by a solid line in FIG. 3, distal end surface 61 of second protruding portion 52 is brought into contact with second flat surface 45, and a portion or an entirety of fourth curved surface 56 oppositely faces second curved surface 43 in a spaced-apart manner in the X direction. Further, although not shown, similarly, in a state where manufactured battery pack 1 is not yet used, distal end surface 60 of first protruding portion 51 is brought into contact with first flat surface 42, and a portion or an entirety of third curved surface 54 oppositely faces first curved surface 41 in a spaced-apart manner in the X direction.

According to the above-mentioned first exemplary embodiment, housing-side end plate 23 can be made stationary with respect to housing 2 in the Y direction by a force which distal end surface 60 of first protruding portion 51 receives from first flat surface 42 and a force which distal end surface 61 of second protruding portion 52 receives from second flat surface 45. Accordingly, housing-side end plate 23 can be positioned with respect to housing 2 in the Y direction. Further, as shown in FIG. 3, second protruding portion 52 can be moved from a position indicated by a solid line in FIG. 3 to a position indicated by a dotted line in FIG. 3, that is, to a position where an entirety of fourth curved surface 56 is brought into contact with second curved surface 43, and first protruding portion 51 can be also moved to a position where an entirety of third curved surface 54 is brought into contact with first curved surface 41. Accordingly, housing-side end plate 23 can be moved toward the housing inner-surface 35 side in the X direction as indicated by arrow B shown in FIG. 2 thus allowing an expansion of battery stack 3 (see FIG. 1) in the X direction. Accordingly, battery stack 3 can be positioned with respect to housing 2 in the Y direction and, further, the expansion of prismatic batteries 10 in the X direction can be allowed and hence, a capacity of battery pack 1 can be easily increased.

Further, in a state where first and second protruding portions 51, 52 are pressed toward the housing inner-surface 35 side due to an expansion of battery stack 3, spring property of first and second protruding portions 51, 52 can be eliminated. Accordingly, housing-side end plate 23 can be engaged with housing inner-surface 35 with certainty in a stable manner.

Further, in a state where battery pack 1 is formed, first and second grooves 70, 71 are symmetric with respect to a plane, and first and second protruding portions 51, 52 which engage with first and second grooves 70, 71 respectively and extend in an approximately arcuate shape are also symmetric with respect to a plane. Accordingly, as shown in FIG. 3, first and second grooves 70, 71 can respectively receive from first and second protruding portions 51, 52 both an X-direction component Fx of a force F and a Y-direction component Fy of the force F. Accordingly, not only battery stack 3 can be positioned in two directions, that is, in the X direction and in the Y direction but also housing 2 can receive also a bending moment generated in housing-side end plate 23 in a dispersed and attenuated state and hence, it is possible to efficiently eliminate strain generated on housing-side end plate 23.

Further, first and second grooves 70, 71 can be easily formed on body 5 of housing 2 by injection molding or the like, and first and second protruding portions 51, 52 can be also formed on housing-side end plate 23 by injection molding or the like. Further, it is unnecessary to fix housing-side end plate 23 to housing 2 by screws and hence, workability can be enhanced.

Relative positions of first and second protruding portions 51, 52 with respect to first and second grooves 70, 71 in an initial state before battery pack 1 is used can be decided suitably for every specification by taking into account an expansion and a size tolerance of prismatic battery 10. In a state where the spring property of first and second protruding portions 51, 52 is eliminated, first and second protruding portions 51, 52 may be entirely housed in first and second grooves 70, 71 respectively, and may be partially housed in first and second grooves 70, 71 respectively. The description has been made with respect to the case where battery pack 1 includes two pairs of engaging portions 40, and two pairs of protruding structures 50 corresponding to the two pairs of engaging portions 40. However, the battery pack may include a pair of engaging portions, and a pair of protruding structures corresponding to the pair of engaging portions. Alternatively, the battery pack may include three or more pairs of engaging portions, and three or more pairs of protruding structures corresponding to the three or more pairs of engaging portions.

Second Exemplary Embodiment

Figure 4:
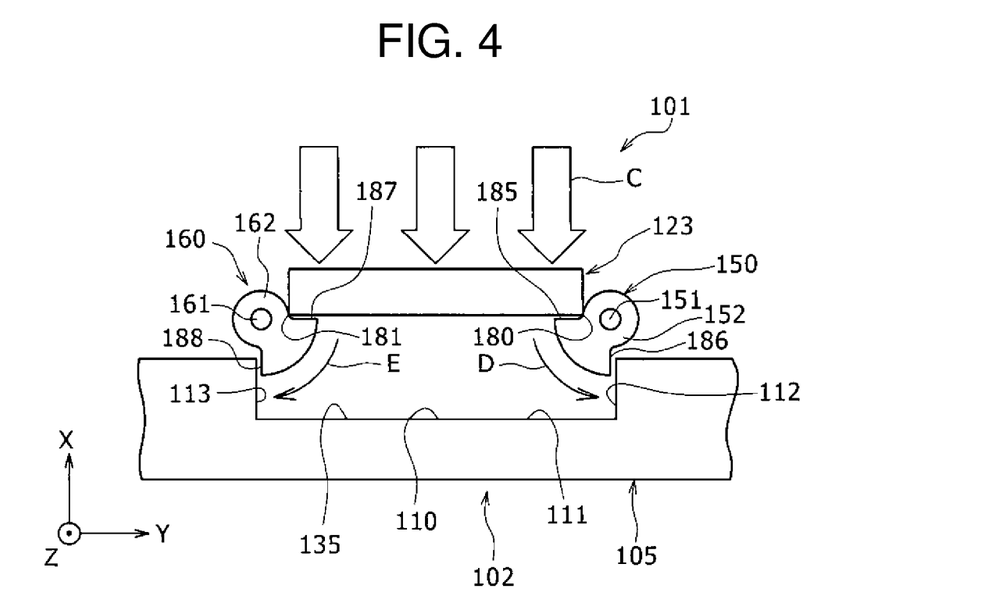
FIG. 4 is a view showing a configuration of a battery pack according to a second exemplary embodiment corresponding to FIG. 2.

FIG. 4 is a view showing a configuration of battery pack 101 according to a second exemplary embodiment corresponding to FIG. 2. The second exemplary embodiment differs from the first exemplary embodiment only with respect to the structure around housing-side end plate 123, and the overall configuration of the second exemplary embodiment is equal to the overall configuration of the first exemplary embodiment. In the second exemplary embodiment, descriptions of a manner of operation and a modification identical to those of the first exemplary embodiment are omitted, and only a configuration which makes the second exemplary embodiment different from the first exemplary embodiment is described.

As shown in FIG. 4, in battery pack 101, body 105 of housing 102 has recessed portion 110, and recessed portion 110 has a rectangular shape as viewed in a plan view in the Z direction. Further, battery pack 101 includes one-side rotation mechanism 150, and opposite-side rotation mechanism 160. Recessed portion 110 of housing 102, one-side rotation mechanism 150, and opposite-side rotation mechanism 160 form a plate movement allowing and positioning mechanism.

As viewed in a plan view in the Z direction, bottom portion 111 of recessed portion 110 extends in the Y direction, and one-side and opposite-side side walls 112, 113 of recessed portion 110 extend in the X direction. Further, one-side rotation mechanism 150 is disposed on one side in the Y direction with respect to a center of housing-side end plate 123 in the Y direction, and opposite-side rotation mechanism 160 is disposed on the other side in the Y direction with respect to the center.

One-side rotation mechanism 150 includes shaft portion 151, and rotation member 152. Shaft portion 151 has a circular columnar shape, is mounted on a bottom portion (not shown) of housing 102, and extends in the Z direction. Further, rotation member 152 is mounted on a cylindrical outer peripheral surface of shaft portion 151 in a rotatable manner about shaft portion 151. Rotation member 152 includes engaging portion 185, and one-side wall-facing surface 186. Engaging portion 185 engages with corner portion 180 of housing-side end plate 123 disposed on a housing inner-surface 135 side and on one side in the Y direction. One-side wall-facing surface 186 oppositely faces one-side side wall 112 of recessed portion 110 in the Y direction. In a state where battery pack 101 is not yet used and the battery stack (not shown) is not expanded, one-side wall-facing surface 186 oppositely faces one-side side wall 112 in a spaced-apart manner in the Y direction.

Similarly, opposite-side rotation mechanism 160 includes shaft portion 161, and rotation member 162. Shaft portion 161 has a circular columnar shape, is mounted on a bottom portion (not shown) of housing 102, and extends in the Z direction. Rotation member 162 is mounted on a cylindrical outer peripheral surface of shaft portion 161 in a rotatable manner about shaft portion 161. Rotation member 162 includes engaging portion 187, and opposite-side wall-facing surface 188. Engaging portion 187 engages corner portion 181 of housing-side end plate 123 disposed on the housing inner-surface 135 side and on the other side in the Y direction. Further, opposite-side wall-facing surface 188 oppositely faces opposite-side side wall 113 of recessed portion 110 in the Y direction. In a state where battery pack 101 is not used and the battery stack (not shown) is not expanded, opposite-side wall-facing surface 188 oppositely faces opposite-side side wall 113 in a spaced-apart manner in the Y direction.

Housing-side end plate 123 is sandwiched between rotation member 152 and rotation member 162 in the Y direction so that housing-side end plate 123 is positioned with respect to housing 102 in the Y direction. Further, rotation member 152 can rotate in a counterclockwise direction indicated by arrow D and rotation member 162 can rotate in a clockwise direction indicated by arrow E and hence, respective engaging portions 185, 187 become movable toward the housing inner-surface 135 side in the X direction along with the rotation of rotation members 152, 162. Accordingly, housing-side end plate 123 can move in a direction indicated by arrow C toward the housing inner-surface 135 side in the X direction thus allowing expansion of the battery stack (not shown) in the X direction. Further, when rotation member 152 is brought into contact with one-side side wall 112 due to the rotation in the counterclockwise direction and rotation member 162 is brought into contact with opposite-side side wall 113 due to the rotation in the clockwise direction, respective rotation members 152, 162 become non-rotatable. Accordingly, in such a state, housing-side end plate 123 can be made to engage with housing 102 with certainty thus positioning housing-side end plate 123 with respect to housing 102 in the X direction and in the Y direction.

Third Exemplary Embodiment

Figure 5:
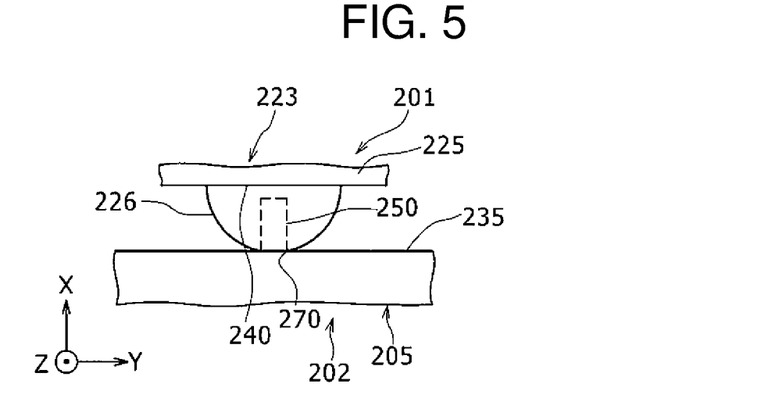
FIG. 5 is a view showing a configuration of a battery pack according to a third exemplary embodiment corresponding to FIG. 2.

FIG. 5 is a view showing a configuration of battery pack 201 according to a third exemplary embodiment corresponding to FIG. 2. FIG. 5 shows a configuration relating to semispherical portion 226 described hereinafter, and illustration of slits 271 is omitted. The third exemplary embodiment differs from the first exemplary embodiment only with respect to the structure around housing-side end plate 223, and an overall configuration is equal to the overall configuration of the first exemplary embodiment. In the third exemplary embodiment, descriptions of a manner of operation and a modification identical to those of the first exemplary embodiment are omitted, and only a configuration which makes the third exemplary embodiment different from the first exemplary embodiment is described.

As shown in FIG. 5, in battery pack 201, body 205 of housing 202 includes shaft portion 250 which extends from housing inner-surface 235 in the X direction. Housing-side end plate 223 includes body 225, and semispherical portion 226. Shaft portion 250 of housing 202 and semispherical portion 226 form a plate movement allowing and positioning mechanism. Body 225 has housing-side surface 240 which extends substantially parallel to housing inner-surface 235. Semispherical portion 226 is mounted on body 225 by an adhesive agent or by welding while protruding toward a housing inner-surface 235 side. Semispherical portion 226 is made of stainless steel or an iron-based steel material having a spring property.

Figure 6:
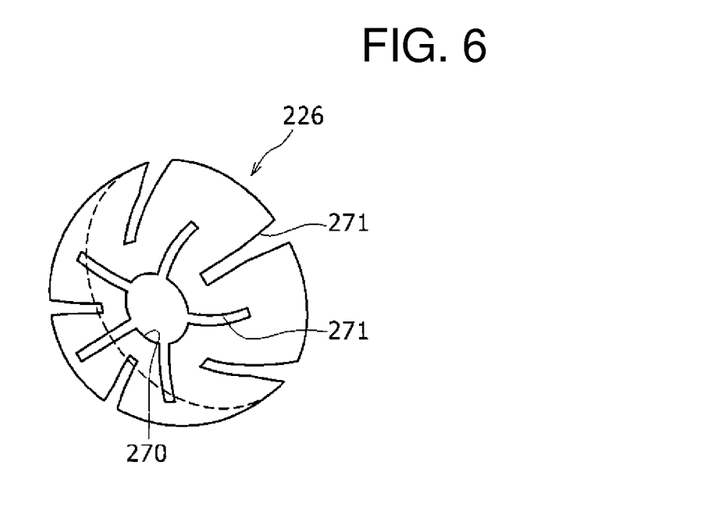
FIG. 6 is a perspective view of a semispherical portion included in a housing-side end plate of the battery pack according to the third exemplary embodiment.

FIG. 6 is a perspective view of semispherical portion 226. As shown in FIG. 6, semispherical portion 226 has a structure where circular cylindrical through hole 270 and a plurality of slits 271 are formed. Circular cylindrical through hole 270 extends in an axial direction of a hollow semispherical member having a semispherical recessed portion. An inner diameter of circular cylindrical through hole 270 substantially agrees with an outer diameter of shaft portion 250. With reference to FIG. 5 again, housing 202 has shaft portion 250 protruding from housing inner-surface 235 in the X direction, and shaft portion 250 passes through circular cylindrical through hole 270 of semispherical portion 226.

According to the third exemplary embodiment, shaft portion 250 of housing 202 is inserted into circular cylindrical through hole 270 of semispherical portion 226. Accordingly, the relative movement of semispherical portion 226 with respect to shaft portion 250 in the Y direction and the Z direction is restricted. As a result, housing-side end plate 223 is positioned with respect to housing 202 in the Y direction and the Z direction.

Figure 7:
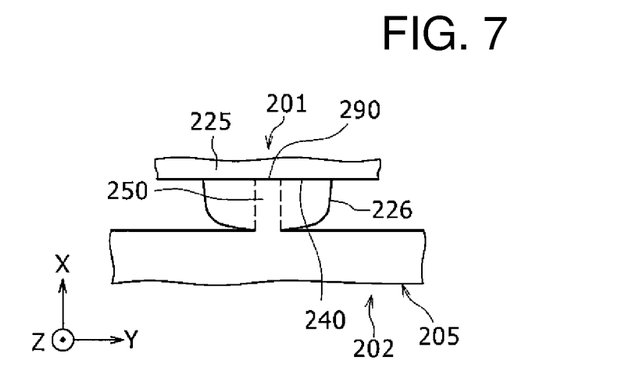
FIG. 7 is a view showing a housing-side end plate in a state where a size of a semispherical portion in a stacking direction is made small due to an elastic deformation.

Semispherical portion 226 is made of stainless steel or an iron-based steel material having a spring property, and has a plurality of slits 271. Accordingly, as shown in FIG. 7, semispherical portion 226 is elastically deformable such that a size in the X direction is made small. Accordingly, housing-side end plate 223 can move toward the housing inner-surface 235 side in the X direction thus allowing expansion of the battery stack (not shown) in the X direction. When a size of semispherical portion 226 in the X direction contracts until distal end surface 290 of shaft portion 250 is brought into contact with housing-side surface 240 of body 225, housing-side end plate 223 becomes non-movable in the X direction relative to body 205 of housing 202 thus being positioned with respect to body 205 of housing 202 in the X direction.

Further, semispherical portion 226 has an annular structure having a center axis thereof extending in the X direction. Accordingly, due to the elastic deformation of semispherical portion 226, semispherical portion 226 absorbs all of X-direction component Fx, Y-direction component Fy, and Z-direction component Fz of force F generated in the battery stack. Accordingly, a strain generated on battery stack 3 can be further efficiently eliminated.

In the third exemplary embodiment, semispherical portion 226 is disposed on housing-side end plate 223 in a state where semispherical portion 226 protrudes toward the housing inner-surface 235 side. However, the semispherical portion may be disposed on the housing-side end plate in a state where the semispherical portion protrudes toward the housing-side end plate side. Alternatively, the semispherical portion may be disposed on the housing inner-surface in a state where the semispherical portion protrudes toward the housing-side end plate side. In this case, it is preferable that a circular-rod-shaped shaft portion inserted into a through hole of the semispherical portion be formed on the housing-side end plate. Alternatively, the semispherical portion may be disposed on the housing inner-surface in a state where the semispherical portion protrudes toward the housing-inner-surface side.

Figure 8A:
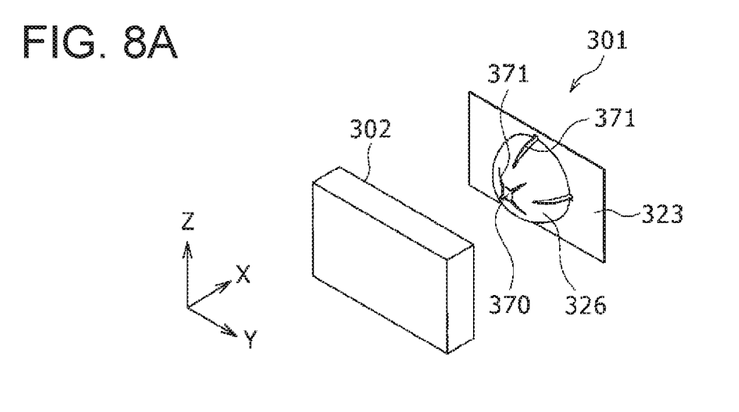
FIG. 8A is a perspective view showing a housing-side end plate and a portion of a housing which oppositely faces the housing-side end plate in a stacking direction in a battery pack according to a modification of the third exemplary embodiment.
Figure 8B:
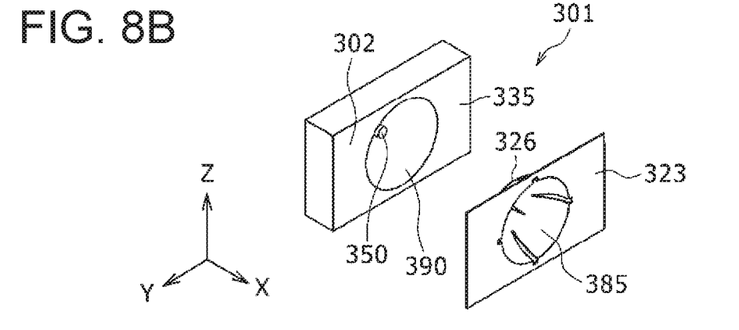
FIG. 8B is a perspective view when the housing-side end plate and a portion of the housing which oppositely faces the housing-side end plate are viewed at an angle different from a viewing angle of FIG. 8A.
Figure 8C:
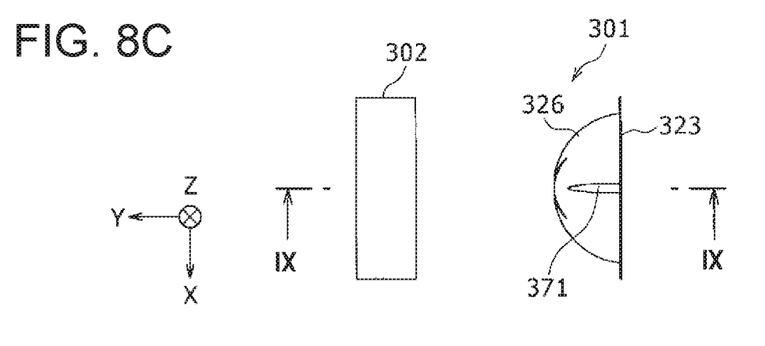
FIG. 8C is a side view of the housing-side end plate, and a portion of the housing which oppositely faces the housing-side end plate in a stacking direction.
Figure 9:
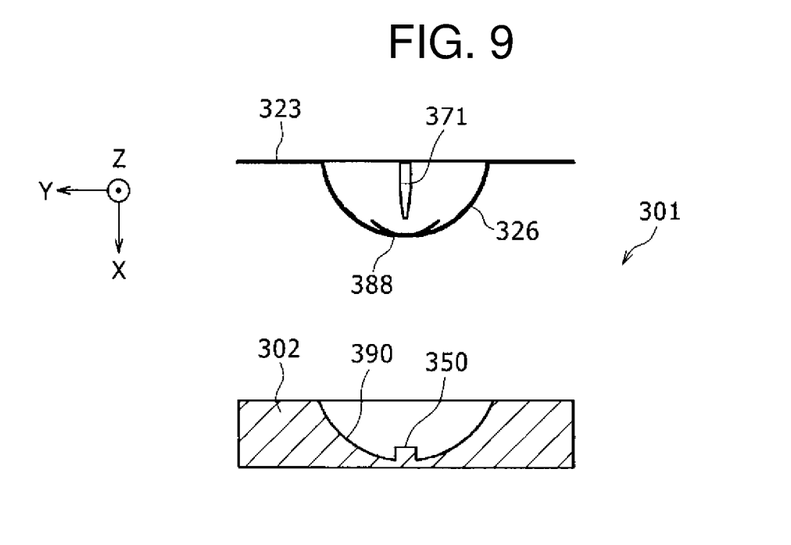
FIG. 9 is a cross-sectional view taken along line IX-IX in FIG. 8C in a state where the housing-side end plate and a portion of the housing which oppositely faces the housing-side end plate in the stacking direction are spaced-apart from each other in the stacking direction.
Figure 10:
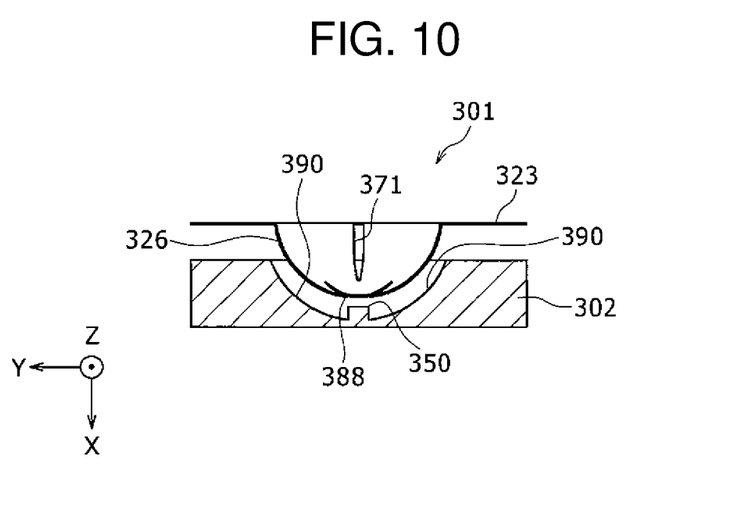
FIG. 10 is a cross-sectional view taken along line IX-IX in FIG. 8C in a state where a portion of a semispherical portion of the housing-side end plate enters a recessed portion formed on a housing inner-surface.

Alternatively, as in the case of battery pack 301 according to a modification of the third exemplary embodiment which is partially shown in FIG. 8, FIG. 9 and FIG. 10, semispherical recessed portion 390 which corresponds to an outer surface of semispherical portion 326 may be formed on housing inner-surface 335. To be more specific, FIG. 8A is a perspective view showing housing-side end plate 323 and a portion of housing 302 which oppositely faces housing-side end plate 323 in the X direction in battery pack 301 according to the modification, and FIG. 8B is a perspective view when housing-side end plate 323 and a portion of housing 302 which oppositely faces housing-side end plate 323 in the X direction are viewed at an angle different from a viewing angle of FIG. 8A. FIG. 8C is a side view of housing-side end plate 323, and a portion of housing 302 which oppositely faces housing-side end plate 323 in the X direction. FIG. 9 is a cross-sectional view taken along line IX-IX in FIG. 8C in a state where housing-side end plate 323 and a portion of housing 302 which oppositely faces housing-side end plate 323 in the X direction are spaced-apart from each other in the X direction. Further, FIG. 10 is a cross-sectional view taken along line IX-IX in FIG. 8C in a state where a portion of semispherical portion 326 of housing-side end plate 323 enters recessed portion 390 formed on housing inner-surface 335.

As shown in FIG. 8A, also in battery pack 301, semispherical portion 326 has circular cylindrical through hole 370 which extends along a center axis of semispherical portion 326 and a plurality of slits 371. As shown in FIG. 8B, housing inner-surface 335 has circular-rod-shaped shaft portion 350 which protrudes toward the housing-side end plate 323 side in the X direction along a center axis of semispherical recessed portion 390. A length of shaft portion 350 is smaller than a radius of semispherical portion 326. Semispherical recessed portion 385 exists on a back side of semispherical portion 326. Further, when housing-side end plate 323 is viewed in the X direction from a side opposite to the housing inner-surface 335 side, recessed portion 385 of semispherical portion 326 can be visually recognized, and recessed portion 385 exists on housing-side end plate 323. By forming semispherical recessed portion 385 on the back side of semispherical portion 326, resiliency of semispherical portion 326 can be increased.

In FIG. 9 and FIG. 10, reference numeral 388 indicates an opening of circular cylindrical through hole 370. As shown in FIG. 9 and FIG. 10, a center axis of circular cylindrical through hole 370 and a center axis of shaft portion 350 are positioned on substantially the same straight line. When the battery module expands in the X direction, and housing-side end plate 323 moves toward the housing inner-surface 335 side, semispherical portion 326 is fitted in recessed portion 390, and an outer surface of semispherical portion 326 is brought into contact with a bottom surface of recessed portion 390. In such a state, shaft portion 350 is fitted into circular cylindrical through hole 370.

According to battery pack 301, semispherical recessed portion 390 which corresponds to semispherical portion 326 is formed on housing inner-surface 335 and hence, substantially the whole outer surface of semispherical portion 326 can be guided by semispherical recessed portion 390. Accordingly, it is possible to suppress the occurrence of a phenomenon that semispherical portion 326 is asymmetrically compressed to circular cylindrical through hole 370, and a positioning accuracy of housing-side end plate 323 in a state where semispherical portion 326 is compressed can be enhanced. Further, substantially the whole outer surface of semispherical portion 326 can be supported by the bottom surface of recessed portion 390 and hence, even in a case where an external force is applied to the battery pack, it is possible to suppress the occurrence of a phenomenon that a large force acts only on a local portion of the outer surface of semispherical portion 326. Accordingly, a durability of semispherical portion 326 can be enhanced thus prolonging a lifetime of housing-side end plate 323.

This disclosure should not be limited to the exemplary embodiments described above and modifications of the exemplary embodiments described above, and various improvements and alterations can be made within the matter described in the scope of the appended claims and equivalents of the matter described in the appended claims.

For example, in the above-mentioned first to third exemplary embodiments, all of opposite-end-side restraint portions 24 of respective battery stacks 3 included in battery pack 1 are equal, and are formed of portion 7a of partition wall 7 which is positioned at the center in the X direction and extends in the Y direction (see FIG. 1). However, the one-side restraint portion of each battery stack included in the battery pack may be one-side bind bar which restrains one side of the battery stack in the Y direction, that is, may be a dedicated part which restrains only one side of the battery stack in the Y direction. Further, the opposite-side restraint portion of each battery stack included in the battery pack may be an opposite-side bind bar which restrains the other side of the battery stack in the Y direction, that is, may be a dedicated part which restrains only the other side of the battery stack in the Y direction. Further, the opposite-end-side restraint portion of each battery stack included in the battery pack may be an opposite-side end plate which restrains only the other side of the battery stack in the X direction, that is, may be a dedicated part which restrains only the other side of the battery stack in the X direction. Further, the housing-side end plate may be configured to be movable in the X direction in a state where both sides of the housing-side end plate in the Y direction are guided by one-side and opposite-side bind bars.

Although the description has been made with respect to the case where the plate movement allowing and positioning mechanism is disposed on only one side of battery stack 3 in the X direction, the plate movement allowing and positioning mechanism may be disposed on both sides, that is, one side and the other side of the battery stack in the X direction. Further, in all exemplary embodiments and modifications, the housing-side end plate may be engaged with the prismatic battery disposed at the end by screws but need not be engaged by screws. Further, in the case where the plate movement allowing and positioning mechanism is disposed on only one side of the battery stack in the X direction, it is preferable to provide an opposite-end-side restraint portion which is not movable relative to the bottom portion of the housing on the other side of the battery stack in the X direction.

The invention claimed is:

1. A battery pack comprising:
   a housing;
   a battery stack that is housed in the housing, the battery stack including a plurality of prismatic batteries stacked on each other in a row, each of the plurality of prismatic batteries having a substantially rectangular-parallelepiped shape and having a pair of end surfaces and two pairs of side surfaces, one of the two pairs of side surfaces being substantially orthogonal to a stacking direction of the prismatic batteries;
   a one-side restraint portion that is positioned on one side of the respective prismatic batteries in an orthogonal direction orthogonal to both of the stacking direction and a height direction, and restrains one side of the battery stack in the orthogonal direction;
   an opposite-side restraint portion that is positioned on another side of the respective prismatic batteries in the orthogonal direction, and restrains another side of the battery stack in the orthogonal direction;
   a housing-side end plate that restrains one side of the battery stack in the stacking direction by being brought into contact with an end surface on one side in the stacking direction of the battery stack, and oppositely faces a housing inner-surface in the stacking direction; and
   a plate movement allowing and positioning mechanism that allows movement of the housing-side end plate in the stacking direction, and positions the housing-side end plate with respect to the housing in the orthogonal direction,
   wherein, as viewed in a plan view from an outer side in the height direction,
   the housing inner-surface includes:
      a first curved surface that is displaced toward a side opposite to a side of the battery stack in the stacking direction as the first curved surface extends toward one side in the orthogonal direction;
      a first flat surface that extends toward the side of the battery stack in the stacking direction from an end of the first curved surface on the one side in the orthogonal direction;
      a second curved surface that is positioned more on another side in the orthogonal direction titan the first curved surface, and is displaced toward a side opposite to the side of the battery stack in the stacking direction as the second curved surface extends toward the other side in the orthogonal direction; and
      a second flat surface that extends toward the side of the battery stack in the stacking direction from an end of the second curved surface on the other side in the orthogonal direction, and
   the housing-side end plate includes:
      a first protruding portion that protrudes toward a side of the housing inner-surface in the stacking direction, and has a third curved surface where a surface on the side of the housing inner-surface in the stacking direction is displaced toward a side opposite to the side of the battery stack in the stacking direction as the surface extends toward the one side in the orthogonal direction; and
      a second protruding portion that protrudes toward the side of the housing inner-surface in the stacking direction, and has a fourth curved surface where a surface on the side of the housing inner-surface in the stacking direction is displaced toward a side opposite to the side of the battery stack in the stacking direction as the surface extends toward the other side in the orthogonal direction,
      a distal end surface of the first protruding portion is in contact with the first flat surface, and a distal end surface of the second protruding portion is in contact with the second flat surface, and
   the housing-side end plate is movable in the stacking direction toward the side of the housing inner-surface until the third curved surface is brought into contact with the first curved surface and the fourth curved surface is brought into contact with the second curved surface.

2. A battery pack comprising:
   a housing;
   a battery stack that is housed in the housing, the battery stack including a plurality of prismatic batteries stacked on each other in a row, each of the plurality of prismatic batteries having a substantially rectangular-parallelepiped shape and having a pair of end surfaces and two pairs of side surfaces, one of the two pairs of side surfaces being substantially orthogonal to a stacking direction of the prismatic batteries;
   a one-side restraint portion that is positioned on one side of the respective prismatic batteries in an orthogonal direction orthogonal to both of the stacking direction and a height direction, and restrains one side of the battery stack in the orthogonal direction;
   an opposite-side restraint portion that is positioned on another side of the respective prismatic batteries in the orthogonal direction, and restrains another side of the battery stack in the orthogonal direction;
   a housing-side end plate that restrains one side of the battery stack in the stacking direction by being brought into contact with an end surface on one side in the stacking direction of the battery stack, and oppositely faces a housing inner-surface in the stacking direction; and
   a plate movement allowing and positioning mechanism that allows movement of the housing-side end plate in the stacking direction, and positions the housing-side end plate with respect to the housing in the orthogonal direction,
   wherein the housing includes a recessed portion,
   the battery pack includes a one-side rotation mechanism disposed on one side in the orthogonal direction with respect to a center of the housing-side end plate in the orthogonal direction, and an opposite-side rotation mechanism disposed on another side in the orthogonal direction with respect to the center, the one-side rotation mechanism and the opposite-side rotation mechanism each include: a shaft portion that is mounted on the housing and extends in the height direction; and a rotation member that is mounted on a circular cylindrical outer peripheral surface of the shaft portion in a rotatable manner about the shaft portion, the rotation member has: an engaging portion that engages with a corner portion of the housing-side end plate on a side of the housing inner-surface; and a side wall-facing surface that oppositely faces a side wall of the recessed portion in the orthogonal direction, and the engaging portion is movable in the stacking direction toward the side of the housing inner-surface due to rotation of the rotation member about the shaft portion until the side wall-facing surface is brought into contact with the side wall.

3. A battery pack comprising:

a housing;

a battery stack that is housed in the housing, the battery stack including a plurality of prismatic batteries stacked on each other in a row, each of the plurality of prismatic batteries having a substantially rectangular-parallelepiped shape and having a pair of end surfaces and two pairs of side surfaces, one of the two pairs of side surfaces being substantially orthogonal to a stacking direction of the prismatic batteries;

a one-side restraint portion that is positioned on one side of the respective prismatic batteries in an orthogonal direction orthogonal to both of the stacking direction and a height direction, and restrains one side of the battery stack in the orthogonal direction;

an opposite-side restraint portion that is positioned on another side of the respective prismatic batteries in the orthogonal direction, and restrains another side of the batter r stack in the orthogonal direction;

a housing-side end plate that restrains one side of the battery stack in the stacking direction by being brought into contact with an end surface on one side in the stacking direction of the battery stack, and oppositely faces a housing inner-surface in the stacking direction; and a plate movement allowing and positioning mechanism that allows movement of the housing-side end plate in the stacking direction, and positions the housing-side end plate with respect to the housing in the orthogonal direction, wherein the plate movement allowing and positioning mechanism has a semispherical portion provided with a circular cylindrical through hole and a plurality of slits, the circular cylindrical through hole extending in an axial direction of a hollow semispherical member having a semispherical recessed portion in the semi spherical portion, the semispherical portion is interposed between the housing-side end plate and the housing inner-surface, and the housing-side end plate is movable in the stacking direction toward a side of the housing inner-surface due to compression of the semispherical portion in the stacking direction, and wherein the housing inner-surface includes a shaft portion which is inserted into the circular cylindrical through-hole.

4. The battery pack according to claim 1 further comprising an opposite-end-side restraint portion that restrains another side of the battery stack in the stacking direction by being brought into contact with an end surface on the other side in the stacking direction of the battery stack.

5. The battery pack according to claim 4, wherein the one-side restraint portion is a one-side bind bar that restrains the one side of the battery stack in the orthogonal direction, the opposite-side restraint portion is an opposite-side bind bar that restrains the other side of the battery stack in the orthogonal direction, and the opposite-end-side restraint portion is an opposite-side end plate that restrains the other side of the battery stack in the stacking direction.

6. A battery pack comprising:

a housing;

a plurality of battery stacks arranged in plural rows in the housing, each of the plurality of battery stacks including a plurality of prismatic batteries stacked on each other in a row, each of the plurality of prismatic batteries having a substantially rectangular-parallelepiped shape and having a pair of end surfaces and two pairs of side surfaces, one of the two pairs of side surfaces being substantially orthogonal to a stacking direction of the prismatic batteries;

a common restraint portion that is disposed between every two battery stacks disposed adjacently to each other in an orthogonal direction orthogonal to both the stacking direction and a height direction of the prismatic batteries, and restrains a side surface of one battery stack on a side of the other battery stack out of the two battery stacks and a side surface of the other battery stack on a side of the one battery stack side;

an outer restraint portion that restrains outer sides in the orthogonal direction of battery stacks positioned on both ends in the orthogonal direction out of the plurality of battery stacks;

a housing-side end plate that is provided to each of the battery stacks, restrains one side of the corresponding battery stack in the stacking direction, and oppositely faces a housing inner-surface in the stacking direction;

an integrated opposite-end-side restraint portion that restrains another side of the plurality of battery stacks in the stacking direction; and a plate movement allowing and positioning mechanism that allows movement of the housing-side end plate in the stacking direction, and positions the housing-side end plate in the orthogonal direction with respect to the housing, wherein the housing includes a recessed portion, each of the plurality of battery packs includes a one-side rotation mechanism disposed on one side in the orthogonal direction with respect to a center of the housing-side end plate in the orthogonal direction, and an opposite-side rotation mechanism disposed on another side in the orthogonal direction with respect to the center, the one-side rotation mechanism and the opposite-side rotation mechanism each include: a shaft portion that is mounted on the housing and extends in the height direction; and a rotation member that is mounted on a circular cylindrical outer peripheral surface of the shaft portion in a rotatable manner about the shaft portion, the rotation member has: an engaging portion that engages with a corner portion of the housing-side end plate on a side of the housing inner-surface; and a side wall-facing surface that oppositely faces a side wall of the recessed portion in the orthogonal direction, and the engaging portion is movable in the stacking direction toward the side of the housing inner-surface due to rotation of the rotation member about the shaft portion until the side wall-facing surface is brought into contact with the side wall.

\* \* \* \* \*